United States Patent
Kuo

(10) Patent No.: US 7,590,901 B2
(45) Date of Patent: Sep. 15, 2009

(54) APPARATUS, SYSTEM, AND METHOD FOR DYNAMIC RECOVERY AND RESTORATION FROM DESIGN DEFECTS IN AN INTEGRATED CIRCUIT

(75) Inventor: Lih-Chung Kuo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 467 days.

(21) Appl. No.: 11/419,271

(22) Filed: May 19, 2006

(65) Prior Publication Data

US 2007/0283222 A1    Dec. 6, 2007

(51) Int. Cl.
G01R 31/3187 (2006.01)
G01R 31/42 (2006.01)

(52) U.S. Cl. .................... 714/724; 714/733

(58) Field of Classification Search ............... None
See application file for complete search history.

(56) References Cited

U.S. PATENT DOCUMENTS

| | | | | |
|---|---|---|---|---|
| 3,942,123 A * | 3/1976 | Georgi | ............... | 324/600 |
| 5,295,258 A * | 3/1994 | Jewett et al. | ............... | 714/12 |
| 5,699,539 A * | 12/1997 | Garber et al. | ............... | 711/2 |
| 5,774,336 A * | 6/1998 | Larson | ............... | 361/720 |
| 5,819,072 A | 10/1998 | Bushard et al. | ............... | 395/500 |
| 5,825,064 A * | 10/1998 | Hayashi et al. | ............... | 257/316 |
| 5,940,480 A * | 8/1999 | Jeon et al. | ............... | 379/112.03 |
| 6,462,998 B1 | 10/2002 | Proebsting | ............... | 365/205 |
| 6,553,548 B1 * | 4/2003 | Hekmatpour | ............... | 716/5 |
| 6,687,194 B1 * | 2/2004 | Kobayashi et al. | ............... | 369/13.05 |
| 6,934,889 B2 * | 8/2005 | Owari | ............... | 714/46 |
| 7,200,786 B2 * | 4/2007 | Cheng et al. | ............... | 714/733 |
| 7,231,623 B2 * | 6/2007 | Miller | ............... | 716/11 |
| 7,277,346 B1 * | 10/2007 | Rahim et al. | ............... | 365/225.7 |
| 7,284,166 B2 * | 10/2007 | Zappa et al. | ............... | 714/710 |
| 2003/0074601 A1 * | 4/2003 | Schultz et al. | ............... | 714/15 |
| 2004/0210803 A1 * | 10/2004 | Cheng et al. | ............... | 714/710 |
| 2005/0256882 A1 | 11/2005 | Able et al. | ............... | 707/10 |
| 2007/0206118 A1 * | 9/2007 | Elwan et al. | ............... | 348/553 |

* cited by examiner

Primary Examiner—Cynthia Britt
Assistant Examiner—Dipakkumar Gandhi
(74) Attorney, Agent, or Firm—Kunzler & McKenzie

(57) ABSTRACT

An apparatus, system, and method are disclosed for the recovery from a design defect in an integrated circuit. The apparatus includes an error check module, a control settings module, a retry module, and a recovery module. The error check module discovers that an error has occurred during an operation. The control settings module changes the contents of one or more system control registers according to a set of system control settings that change the logic path of one or more system signals. The retry module executes the operation. The recovery module discovers that the operation was executed successfully.

20 Claims, 5 Drawing Sheets

200

| | 202 | 204 | 206 | 208 | 210 |
|---|---|---|---|---|---|
| | Error | Recovery Settings | Recovery Policy | Error Count | Recovery Failed Count |
| | Interface Parity Check | Increase FIFO forwarding buffer size | Keep New Settings | 1,179 | 6 |
| | CRC Check During Read OP | Decrease DMA data transfer block size | Restore settings after 5 ms | 86 | 11 |
| | ECC Check During Write OP | Decrease Clock Speed | Restore settings after recovery | 253 | 3 |

FIG. 2

APPARATUS, SYSTEM, AND METHOD FOR DYNAMIC RECOVERY AND RESTORATION FROM DESIGN DEFECTS IN AN INTEGRATED CIRCUIT

BACKGROUND OF THE INVENTION

1. Field of the Invention

This invention relates to error recovery and more particularly relates to dynamic error recovery from design defects in an integrated circuit.

2. Description of the Related Art

As companies design and produce integrated circuits, they perform extensive simulations and tests to discover and correct defects in the design of the integrated circuit. Because of time and technical constraints, companies place a higher priority on simulating and testing the most frequently occurring system states. In all but the simplest integrated circuits, it is difficult to simulate and test every possible system state and logic path. The solution to one design defect may also cause other errors, which further complicates the simulation and testing process.

The increasing size and complexity of integrated circuits make it even more difficult to discover and correct design defects before the integrated circuit is mass produced. Once the integrated circuit has gone into production, changes in circuit design are costly and can delay the release of any products involving the integrated circuit. The costs become even greater when design defects are found in the field. There is an increasing need for integrated circuits that can recover from design defects at the system level in the field.

Higher simulation and emulation power have helped to increase the effectiveness of early design defect detection and removal, especially in simple integrated circuits. However, the number of logic paths in each integrated circuit has increased so rapidly, that simulating each logic path in a reasonable amount of time and for a reasonable cost has become very difficult. Because of this difficulty, an increasing number of boundary cases and less frequently used logic paths are not simulated or tested before the production and release of an integrated circuit. Often, design defects still exist in the boundary conditions that were never simulated or tested, which are only discovered after production in the field.

From the foregoing discussion, it should be apparent that a need exists for an apparatus, system, and method for the recovery from design defects in an integrated circuit. Beneficially, such an apparatus, system, and method would allow an integrated circuit to recover from design defects in the field at the system level.

SUMMARY OF THE INVENTION

The present invention has been developed in response to the present state of the art, and in particular, in response to the problems and needs in the art that have not yet been fully solved by currently available dynamic design defect recovery methods. Accordingly, the present invention has been developed to provide an apparatus, system, and method for dynamic recovery and restoration from design defects in an integrated circuit, that overcome many or all of the above-discussed shortcomings in the art.

The apparatus to assist in system recovery from a design defect in an integrated circuit is provided with a plurality of modules configured to functionally execute the necessary steps of discovering that an error occurred, changing the contents of one or more system control registers based on a set of system control settings, executing the operation, and determining if the operation was executed successfully. These modules in the described embodiments include an error check module, a control settings module, a retry module, and a recovery module.

In one embodiment, the error check module discovers that an error has occurred. In a further embodiment, the error check module discovers that the error has occurred during an operation.

In one embodiment, the control settings module changes the contents of one or more system control registers according to a set of system control settings. In a further embodiment, the set of system control settings changes the logic path of one or more system signals.

In one embodiment, the recovery module discovers that the operation was executed successfully. In another embodiment, the recovery module discovers that the system has recovered from the error.

A system of the present invention is also presented to recover from a design defect in an integrated circuit. The system may be embodied by a circuit board, an integrated circuit, and an external interface.

In particular, the circuit board, in one embodiment, provides an insulating base for one or more electronic devices. In a further embodiment, two of the devices include the integrated circuit and the external interface.

In one embodiment, the integrated circuit substantially performs the steps necessary to carry out the functions presented above with respect to the operation of the described apparatus. In another embodiment, the integrated circuit also has a knowledge database with a list of one or more errors, and one or more system control settings corresponding to each error.

In a further embodiment, the external interface is coupled to the circuit board, and in communication with the integrated circuit. The external interface receives updates for the knowledge database from a separate device.

A computer program product of the present invention is also presented for recovery from a design defect in an integrated circuit. In one embodiment, the computer program product discovers that an error has occurred during an operation. The computer program product retrieves a set of system control settings associated with the error from a knowledge database. The knowledge database is a list of one or more errors and one or more system control settings corresponding to each error. The computer program product changes the contents of one or more system control registers according to the set of system control settings. The computer program product discovers that the operation was executed successfully.

A method of the present invention is also presented for providing a customer with a knowledge database for recovery from a design defect in an integrated circuit. The method in the disclosed embodiments substantially includes the steps necessary to carry out the functions presented above with respect to the operation of the described apparatus and system. In one embodiment, the method includes providing a knowledge database to a customer. The method also may include updating the knowledge database for the customer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a schematic block diagram illustrating one embodiment of a knowledge database in accordance with the present invention;

DETAILED DESCRIPTION OF THE INVENTION

Figure 1:
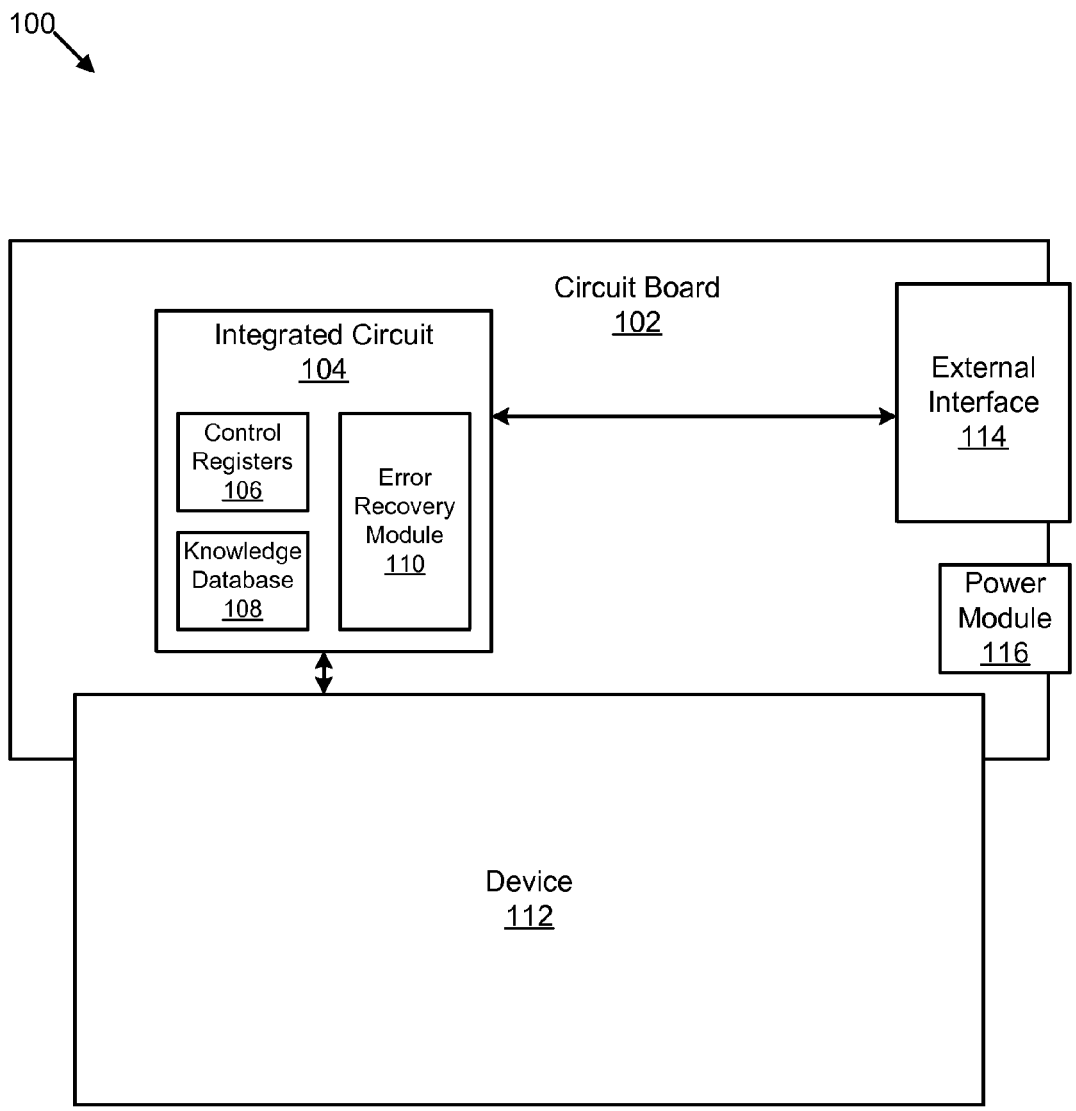
FIG. 1 is a schematic block diagram illustrating one embodiment of a system for the recovery from design defects in an integrated circuit in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts a system 100 for recovery from design defects in an integrated circuit. In one embodiment, the system 100 comprises a circuit board 102, an integrated circuit 104, control registers 106, a knowledge database 108, an error recovery module 110, a device 112, an external interface 114, and a power module 116.

In one embodiment, the circuit board 102 is a thin board made of an insulating material, usually fiberglass, upon which one or more components, including integrated circuits, are mounted to form a circuit or group of circuits that perform a specific function. The circuit board 102 may be a printed circuit board (PCB), a printed wiring board (PWB), or a breadboard.

In one embodiment, the integrated circuit 104 is mounted on the circuit board 102. One example of the integrated circuit 104 is provided and described in more detail with reference to FIG. 3. In one embodiment, the integrated circuit 104 is a die or chip with a single semiconductor substrate and an interconnected array of electrical components such as transistors, resistors, capacitors, and diodes that form one or more electrical circuits possessing specific functions. In a further embodiment, the integrated circuit 104 includes the control registers 106, the knowledge database 108, and the error recovery module 110, which are configured to assist the integrated circuit 104 in recovery from defects in the design of the integrated circuit 104. One example of the knowledge database 108 is provided and described in more detail with reference to FIG. 2. The integrated circuit 104 may also include other modules or circuits configured to perform one or more functions.

The control registers 106, the knowledge database 108, and the error recovery module 110 are provided and described in more detail with reference to FIG. 3. In general, the error recovery module 110 discovers that an error has occurred during an operation on the integrated circuit 104, and changes one or more of the control registers 106 in order to change the logic path of one or more system signals. In one embodiment, the error recovery module 110 retrieves a set of system control settings relating to the error from the knowledge database 108.

In one embodiment, the device 112 is a device coupled to and controlled by the integrated circuit 104. The device 112 may be a sensor, a magnetic or optical disk drive, computer hardware, a home or portable electronic device, or another device that can receive a signal from the integrated circuit 104. In one embodiment, the device 112 is mounted on the circuit board 102. In another embodiment, the device 112 is electrically coupled to the circuit board 102 to receive signals from the integrated circuit 104. In a further embodiment, the integrated circuit 104 performs operations to control the device 112, and the integrated circuit 104 recovers from errors during operations to control the device 112 using the error recovery module 110.

In one embodiment, the external interface 114 is also mounted to the circuit board 102. The external interface 114 provides an interface for the integrated circuit 104 to receive commands, instructions, and microcode updates from a user, client, computer, network, or module. The external interface may be one or more buttons, a keyboard, a universal serial bus (USB) port, a serial port, an institute of electrical and electronics engineers (IEEE) 1394 port, a microphone, a wireless adapter, or another interface capable of receiving data. In one embodiment, the integrated circuit 104 receives updates to the knowledge database 108 from the external interface 114.

In one embodiment the circuit board 102 and components mounted on the circuit board 102 are powered by the power module 116. The power module 116 may be a battery that stores and provides electrical power, or an adapter configured to receive external electrical power. The power module 116 may also provide power to, or receive power from the device 112.

FIG. 2 depicts one embodiment of a knowledge database 200 that may be substantially similar to the knowledge database 108 of FIG. 1. In one embodiment the knowledge database 200 is defined by microcode that is stored and run on an integrated circuit. The knowledge database 200 may be part of the microcode, or a look-up table or other data structure accessible by the microcode. In another embodiment, the knowledge database 200 is stored in persistent storage that is separate from an integrated circuit, but accessible by the integrated circuit. In one embodiment the knowledge database 200 comprises an error list 202, a recovery settings list 204, a recovery policy list 206, an error count list 206, and a recovery failed count list 210, the entries of each list corresponding to an error listed in the error list 202.

In one embodiment, the error list 202 is a list of errors that are known to occur in an integrated circuit. The entries in the error list 202 may be machine readable error codes, human readable character strings, system codes, operation names, or other error representations. For each error listed in the error list 202, there are one or more system control settings listed in the recovery settings list 204. In one embodiment, the system control settings in the recovery settings list 204 are system control register settings which are known to have resolved the corresponding errors from the error list 202 in previous recovery attempts. The system control settings 204 may be specific control settings, or ranges of allowable control settings, and may serve to set the frequency of the system clock, determine how much data a first-in-first-out (FIFO) queue stores before forwarding the data, set the bus mediation method, define the direct memory access (DMA) data transfer block size, disable one or more DMA engines, or control the behavior of other subsystems in the integrated circuit. The recovery settings 204 may change the logic path that one or more system signals follow.

In one embodiment, the recovery policy list 206 consists of a policy defining the amount of time that the system control settings 204 should be implemented to allow the system to recover from the corresponding error in the error list 202. The recovery policies 206 may include keeping the new control settings, restoring the previous control settings after a specific duration of time or clock cycles, restoring the previous control settings after a recovery from the corresponding error from the error list 202, or other recovery policies.

In one embodiment, one or more error statistics, such as the error count list 208 and the recovery failed count list 210, are kept by the knowledge database 200. In one embodiment, the error count list 208 comprises a list of the number of times that each error from the error list 202 has occurred in the integrated circuit. In one embodiment, the recovery failed count list 210 is a list of the number of times that the corresponding recovery settings from the recovery settings list 204 have failed to resolve the corresponding error from the error list 202. Error statistics such as the error count list 208 and the recovery failed count list 210 may be used to measure the success of the settings in the recovery settings list 204 and the policies in the recovery policy list 206, and to update or create new settings 204 or policies 206.

Figure 3:
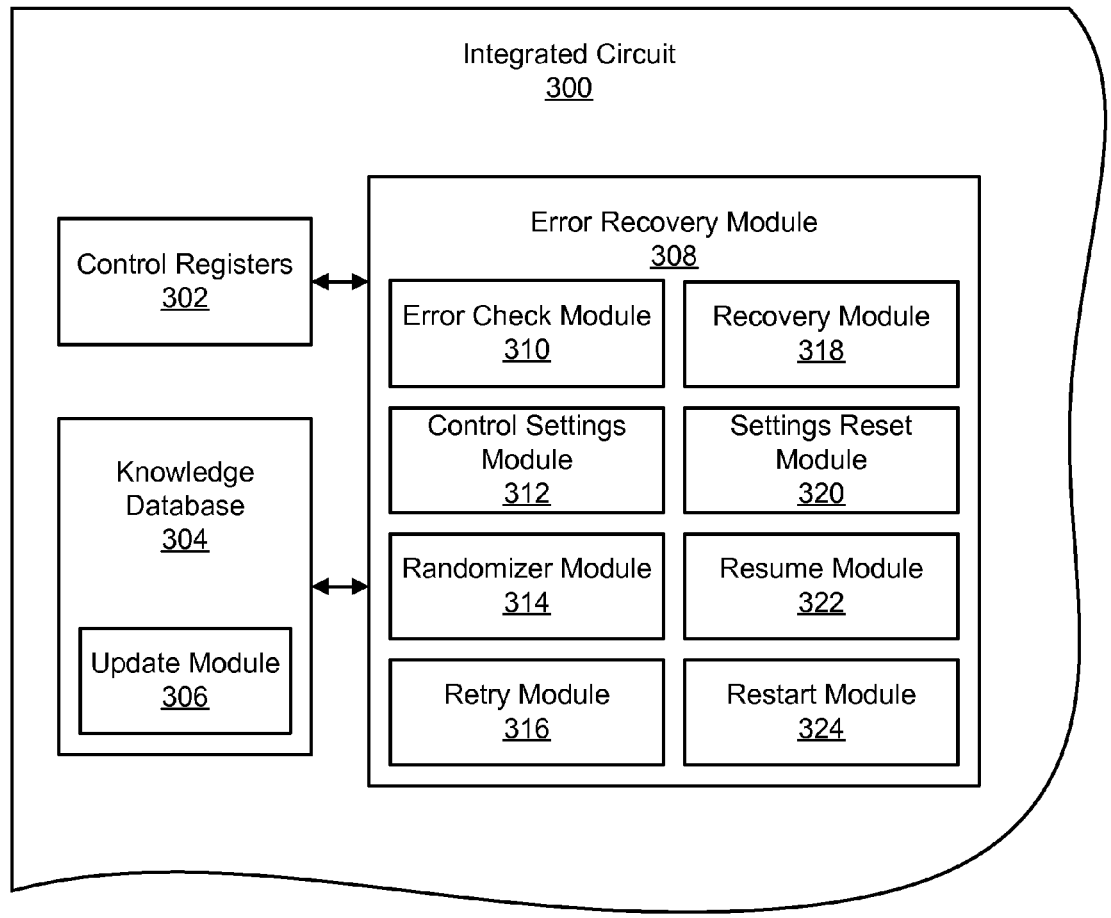
FIG. 3 is a schematic block diagram illustrating one embodiment of an integrated circuit in accordance with the present invention.

FIG. 3 depicts one embodiment of an integrated circuit 300 that may be substantially similar to the integrated circuit 104 of FIG. 1. As described above, in general, the integrated circuit 300 is a die or chip with a single semiconductor substrate and an interconnected array of electrical components such as transistors, resistors, capacitors, and diodes that form one or more electrical circuits possessing a specific function. In one embodiment, the integrated circuit 300 has control registers 302, a knowledge database 304, and an error recovery module 308, which are configured to assist the integrated circuit 300 in recovery from defects in the design of the integrated circuit 300. The integrated circuit 300 may also have other modules and circuits configured to perform other functions.

In one embodiment the control registers 302 may be substantially similar to the control registers 106 of FIG. 1. In a further embodiment, the control registers 302 are onboard system storage registers configured to store one or more system control settings. In another embodiment, the control registers 302 store bits that initiate control signals for various onboard subsystems. The control registers 302 may be latches, flip-flops, or other electronic memory structures. The data stored in the control registers 302 may set the frequency of the system clock, determine how much data a first-in-first-out (FIFO) queue stores before forwarding the data, set the bus mediation method, define the direct memory access (DMA) data transfer block size, disable one or more DMA engines, or control the behavior of other subsystems in the integrated circuit 300.

In one embodiment, the knowledge database 304 may be substantially similar A to the knowledge database 108 of FIG.

1, and the knowledge database 200 of FIG. 2. As described above, the knowledge database 304 comprises a list of one or more errors and one or more system control settings corresponding to each error. The knowledge database 304 may also have a recovery policy, and/or one or more error statistics corresponding to each error in the list. In one embodiment, the data in the knowledge database 304 is provided by the manufacturer of the integrated circuit 300 to customers. In a further embodiment, the knowledge database 304 is updated by an update module 306.

In one embodiment, the update module 306 updates the knowledge database with one or more errors or system control settings. The update module 306 may change the system control settings of an existing error in response to a failed recovery, or add a new error record with corresponding recovery settings in response to an error that was not yet included in the knowledge database 304. The update module 306 may update the knowledge database 304 based on information provided by the error recovery module 308, based on the error statistics in the knowledge database 304, or based on errors reported by other integrated circuits. In one embodiment, the update module 306 updates the knowledge database 304 remotely over a network. The manufacturer of the integrated circuit 300 may provide updates to the knowledge database for the update module 306.

In one embodiment, the error recovery module 308 may be substantially similar to the error recovery module 110 of FIG. 1. As described above, in general, the error recovery module 110 discovers that an error has occurred during an operation on the integrated circuit 300, and changes one or more of the control registers 302 in order to change the logic path of one or more system signals. In one embodiment, the error recovery module 308 retrieves a set of system control settings relating to the error from the knowledge database 304. In one embodiment, the error recovery module 308 comprises an error check module 310, a control settings module 312, a randomizer module 314, a retry module 316, a recovery module 318, a settings reset module 320, a resume module 322, and a restart module 324.

In one embodiment, the error check module 310 discovers that an error has occurred during an operation performed by the integrated circuit 300. In one embodiment, the error check module 310 may discover the error by polling a system status register that contains error information. In another embodiment, the error check module 310 receives an interrupt alerting the error check module 310 that an error has occurred. The error check module 310 may then check a status register to discover the type of error, or the operation that caused the error. The operation is one of a plurality of operations that the integrated circuit 300 is capable of executing.

In one embodiment, the control settings module 312 changes the contents of one or more system control registers 302 according to a set of system control settings that are configured to change the logic path of one or more system signals. In a further embodiment, the control settings module 312 retrieves the set of system control settings from an entry in the knowledge database 304 corresponding to the error discovered by the error check module 310.

In another embodiment, the control settings module 312 retrieves the set of system control settings from the randomizer module 314, which chooses a set of random system control settings from a list of valid system control settings. The list of valid or allowable system control settings may be hard coded into the randomizer module 314, or the randomizer module may retrieve a list of valid system control settings from a default entry in the knowledge database 304. In another embodiment, the control settings module 312 retrieves the set of system control settings from the randomizer module 314 when system control settings for the error do not exist in the knowledge database 304, or when the system control settings listed for the error in the knowledge database 304 do not resolve the error.

In one embodiment, the retry module 316 executes the operation that caused the error. Because the control settings module 312 changed one or more system settings in the system control registers 302, the logic path followed during execution of the operation may now be a logic path that has no design defects or errors.

In one embodiment, the recovery module 318 discovers that the operation was executed successfully. In one embodiment, the recovery module 318 discovers that the operation was executed successfully when a predetermined amount of time or number of clock cycles has passed since the retry module 316 executed the operation. In another embodiment, a subsystem of the integrated circuit 300 signals the recovery module 318 that the operation was executed successfully. In a further embodiment, the recovery module 318 polls a status register to determine if the operation was executed successfully.

In one embodiment, the settings reset module 320 returns the control registers 302 to a previous state in response to a discovery by the recovery module 318 that the operation was executed successfully. In a further embodiment, the settings reset module 320 returns the control registers 302 to a previous state based on the recovery policy entry corresponding to the error in the knowledge database 304. The settings reset module 320 may return the control registers 302 to a previous state immediately, or after a predetermined amount of time or number of clock cycles. This is useful when a decline in system performance or other negative effects are caused by the control settings that resolve the error.

In one embodiment, the resume module 322 saves the status of one or more concurrently executing operations in response to the discovery of the error by the error check module 310, and resumes execution of the operations in response to a discovery by the recovery module 318 that the operation was executed successfully. In one embodiment, not all concurrently executing operations are at a point in their execution when their status may be saved, and their execution resumed.

In one embodiment, the restart module 322 saves a list of one or more concurrently executing operations in response to the discovery of the error by the error check module 310, and restarts the execution of the operations in response to a discovery by the recovery module 318 that the operation was executed successfully. In one embodiment, some concurrently executing operations are resumed by the resume module 322, while operations that are not at a point in their execution when they can be resumed are restarted by the restart module 322.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
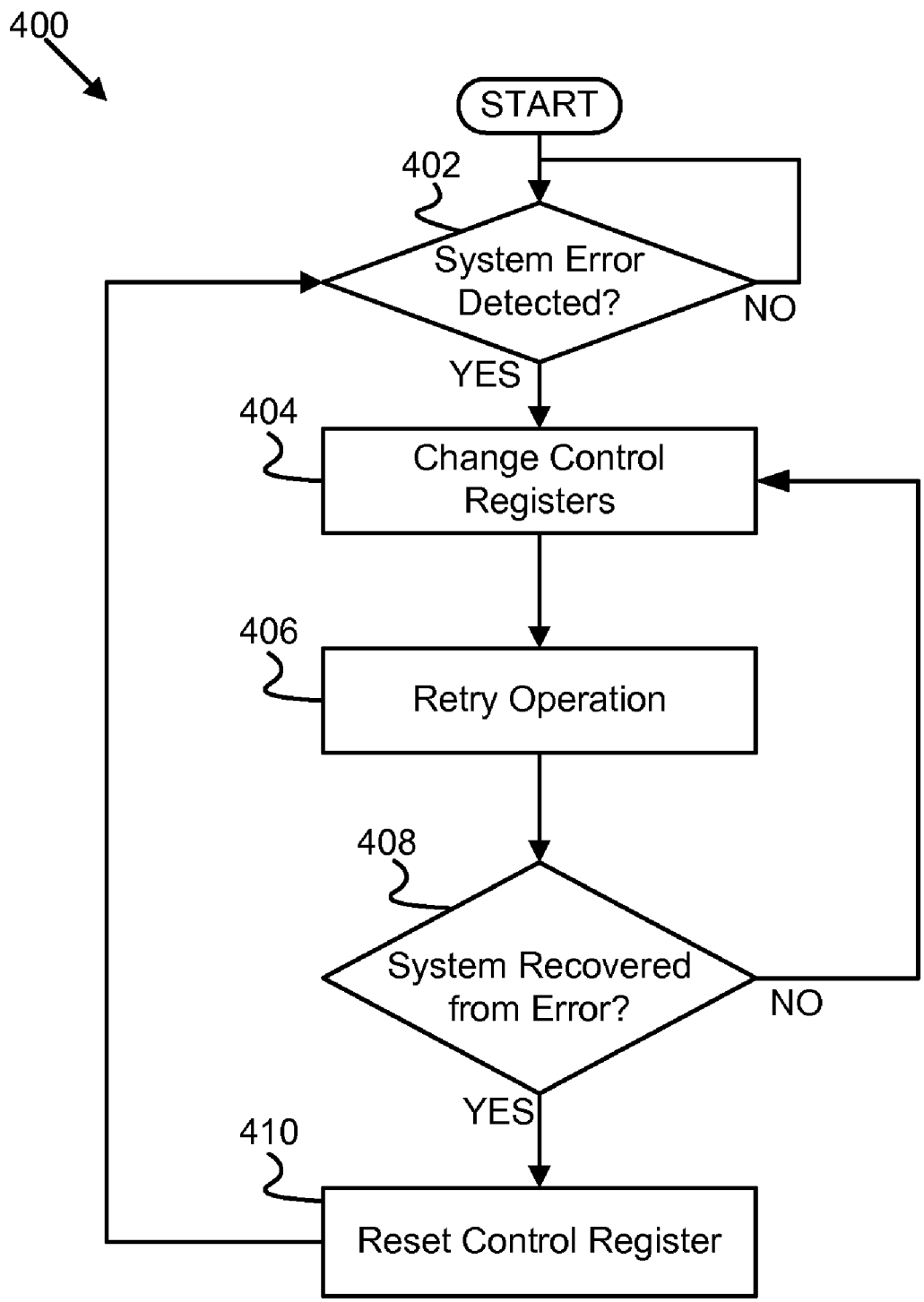
FIG. 4 is a schematic flow chart diagram illustrating one embodiment of a design defect recovery method in accordance with the present invention.

FIG. 4 illustrates one embodiment of a design defect recovery method 400. The error check module 310 checks 402 for a system error during an operation. If there is an error, the control settings module 312 changes 404 the contents of one or more control registers 302 based on a set of system control settings. The system control settings may be hard coded into the control settings module 312, provided by the knowledge database 304, or provided by the randomizer module 314.

The retry module 316 then retries 406 the execution of the operation. Because system settings in the control registers 302 were changed 404 by the control settings module 312, the logic paths taken by system data signals during the execution of the operation may be different than the logic paths taken during the original execution of the operation. Errors due to design defects are more likely to occur in less frequently used logic paths. Changing the logic paths used during the execution of the operation increases the likelihood that the system data signals will follow more frequently used and defect free logic paths.

The recovery module 318 then checks 408 whether the operation finished without errors. In one embodiment, the recovery module 318 polls a status register to check 408 for successful completion of the operation. In another embodiment, the recovery module 318 uses a counter or timer to determine 408 whether the operation has finished without errors. In a further embodiment, a subsystem of the integrated circuit 300 signals the recovery module 318 that it has executed the operation successfully.

If the operation completed execution without errors, the settings reset module 320 resets 410 the control registers 302, and the method 400 returns to step 402, and the error check module 310 detects 402 the next error. If the operation did not complete execution without errors, the method 400 returns to step 404, changing 404 the control registers 302 and continuing the method 400 from step 404.

Figure 5:
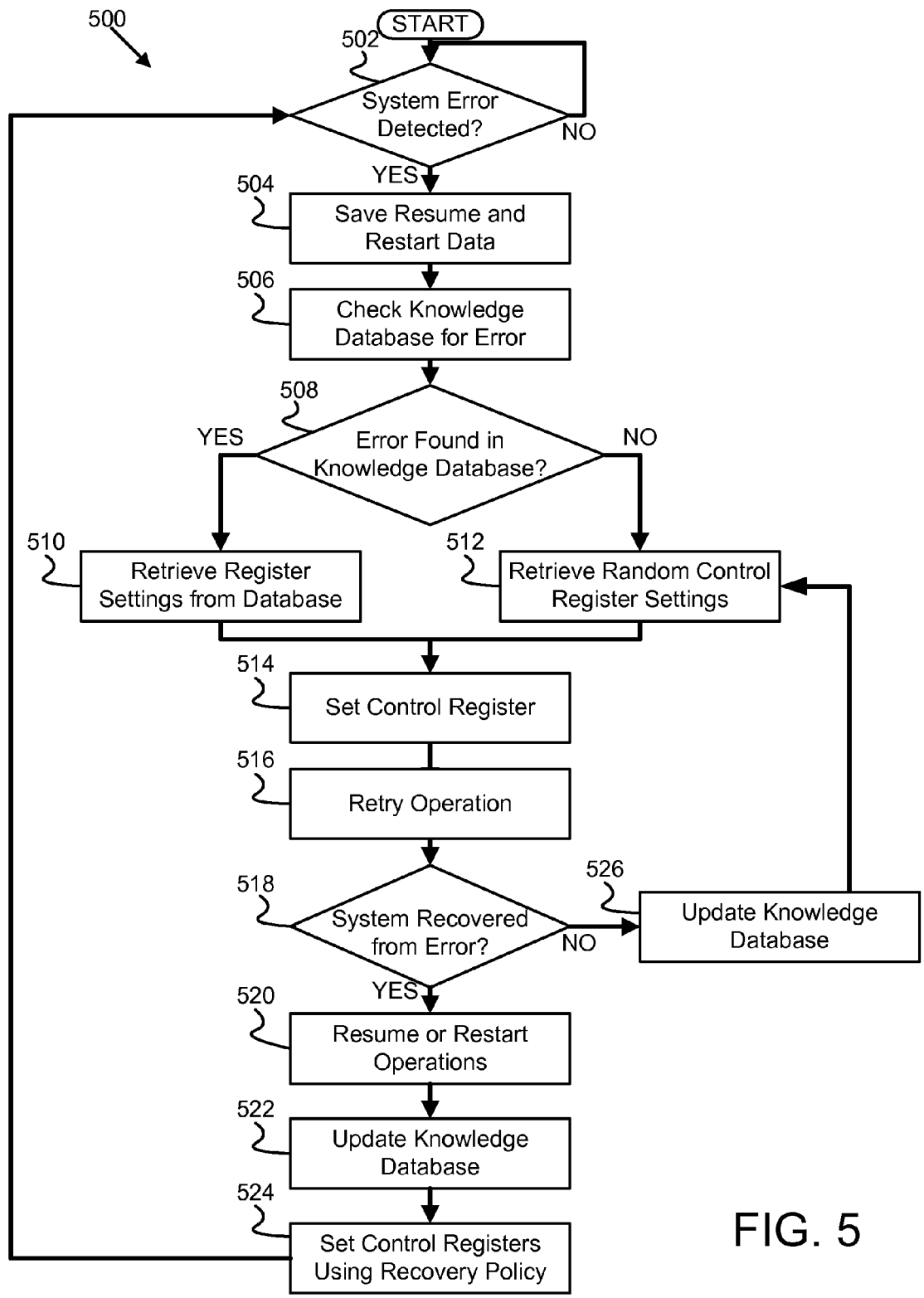
FIG. 5 is a schematic flow chart diagram illustrating a further embodiment of a design defect recovery method in accordance with the present invention.

FIG. 5 illustrates another embodiment of a design defect recovery method 500. The error check module 310 detects 502 whether an error has occurred during an operation. The error check module repeats the error detection step 502 until an error is detected 502. If an error is detected 502, the resume module 322 saves 504 the status of other operations that are executing during the error, that are at a point in their execution that they can be restarted. The restart module 324 saves 504 a list of other operations that are executing during the error that cannot be resumed and must be restarted.

The control settings module 312 checks 508 the knowledge database 304 for an entry corresponding to the error. If an error entry 202 exists in the knowledge database 304 for the error, then the control settings module 312 retrieves 510 the system settings 204 corresponding to the error entry 202 from the knowledge database 304. If no error entry 202 is found for the error in the knowledge database 304, the control settings module 312 retrieves a set of random system settings from the randomizer module 314. The control settings module 312 sets 514 the control registers 302 based on the system settings that it retrieved 510, 512. The retry module 316 retries 516 the execution of the operation.

The recovery module 318 checks 518 whether the system has recovered from the error by successfully executing the operation. If the operation completed successfully, the resume module 322 resumes 520 the execution of the operations whose status the resume module 322 previously saved 504. The restart module 324 may also restart 520 the execution of the operations from the list of operations that the restart module 324 previously saved 504.

The update module 306 updates the knowledge database 304. In one embodiment, the update module 306 updates the knowledge database 304 with one or more error statistics 208, 210. In another embodiment, the update module 306 updates the knowledge database 304 with a new error entry 202 and corresponding recovery settings 204 based on the error that occurred, and the system settings that resolved the error. The settings reset module 320 sets 524 the control registers 302 based on the recovery policy 206. The method 500 returns to step 502, and the error check module 310 detects 502 the next system error, and the method 500 continues.

If the recovery module 318 does not discover 518 that the system has recovered from the error, the update module 306 updates 526 the knowledge database 304. In one embodiment, the update module 306 updates one or more error statistics 208, 210. In another embodiment, the update module 306 updates the recovery settings 204 corresponding to the error entry 202 to reflect the failed recovery, removing or changing the entry.

In one embodiment, the method 500 returns to step 512 to retrieve a set of system control settings from the randomizer module 314, and continues with the method 500. In another embodiment, the method 500 returns to step 510 to retrieve a different set of system control settings 204 also corresponding to the error entry 202, and continues with the method 500.

Advantageously, certain embodiments of the apparatus, system, and method presented above may be implemented to overcome design defects in an integrated circuit in the field using onboard diagnostics and control settings. Certain embodiments also may reduce the cost and complexity of overcoming design defects in integrated circuits.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to assist in recovery from a design defect in an integrated circuit, the apparatus comprising:
   an error check module configured to discover that an error has occurred during an operation within the integrated circuit;
   a control settings module configured to change the contents of one or more system control registers according to a set of system control settings, the set of system control settings changing the logic path of one or more system signals within the integrated circuit;
   a retry module configured to execute the operation within the integrated circuit; and
   a recovery module configured to determine if the operation was executed successfully.

2. The apparatus of claim 1, further comprising a settings reset module configured to return the one or more system control registers to a previous state in response to a successful execution of the operation.

3. The apparatus of claim 1, further comprising a resume module configured to save the status of one or more concurrently executing operations in response to the error, and to resume execution of the operations in response to a successful execution of the operation.

4. The apparatus of claim 1, further comprising a restart module configured to save a list of one or more concurrently executing operations in response to the error, and to restart execution of the operations in response to a successful execution of the operation.

5. The apparatus of claim 1, further comprising a randomizer module configured to choose a set of random system control settings from a list of valid system control settings.

6. The apparatus of claim 1, further comprising a knowledge database comprising a list of one or more errors and one or more system control settings corresponding to each error.

7. The apparatus of claim 6, wherein the knowledge database further comprises one or more statistics corresponding to each error.

8. The apparatus of claim 6, wherein the knowledge database further comprises a recovery policy corresponding to each error.

9. The apparatus of claim 6, further comprising an update module configured to update the knowledge database with one or more errors or system control settings.

10. A system to recover from a design defect in an integrated circuit, the system comprising:
- a circuit board configured to provide an insulating base for one or more electronic devices;
- an integrated circuit coupled to the circuit board, the integrated circuit configured to:
  - discover that an error has occurred during an operation;
  - retrieve a set of system control settings associated with the error from a knowledge database, the knowledge database comprising a list of one or more errors and one or more system control settings corresponding to each error;
  - change the contents of one or more system control registers according to the set of system control settings;
  - execute the operation; and
  - determine if the operation was executed successfully; and
- an external interface coupled to the circuit board and in communication with the integrated circuit, the external interface configured to receive updates for the knowledge database from a separate device.

11. The system of claim 10, wherein the knowledge database further comprises one or more statistics corresponding to each error.

12. The system of claim 10, wherein the knowledge database further comprises a recovery policy corresponding to each error.

13. A computer program product comprising a computer readable medium having computer usable program code programmed for recovery from a design defect in an integrated circuit, the operations of the computer program product comprising:
- discovering that an error has occurred during an operation within the integrated circuit;
- retrieving a set of system control settings associated with the error from a knowledge database, the knowledge database comprising a list of one or more errors and one or more system control settings corresponding to each error;
- changing the contents of one or more system control registers according to the set of system control settings, the set of system control settings changing the logic path of one or more system signals within the integrated circuit;
- executing the operation within the integrated circuit; and
- determining if the operation was executed successfully.

14. The computer program product of claim 13, further comprising returning the one or more system control registers to a previous state in response to a successful execution of the operation.

15. The computer program product of claim 13, further comprising saving the status of one or more concurrently executing operations in response to the error, and resuming execution of the operations in response to a successful execution of the operation.

16. The computer program product of claim 13, further comprising saving a list of one or more concurrently executing operations in response to an error, and restarting execution of the operations in response to a successful execution of the operation.

17. A method for providing a customer with a knowledge database for recovery from a design defect in an integrated circuit, the method comprising:
- providing a knowledge database to the integrated circuit of a customer using an external interface coupled to the integrated circuit, the knowledge database comprising a list of one or more errors known to occur in the integrated circuit, and one or more system control settings corresponding to each error, the system control settings configured to change the logic path of one or more signals in the integrated circuit; and
- updating the knowledge database for the customer using the external interface coupled to the integrated circuit.

18. The method of claim 17, wherein the knowledge database further comprises a recovery policy corresponding to each error.

19. The method of claim 17, wherein the knowledge database is updated remotely over a network.

20. The method of claim 19, wherein the knowledge database is updated based on errors reported by other customers.

* * * * *